US008655351B2

(12) United States Patent
Sinton et al.

(10) Patent No.: US 8,655,351 B2
(45) Date of Patent: Feb. 18, 2014

(54) METHOD AND DEVICE FOR MAINTAINING CONTINUITY OF RADIO TRANSMISSIONS

(75) Inventors: Lee Corey Sinton, Berkshire (GB); Ahmar Ghafoor, Reading (GB); Neil Briffett, Surrey (GB)

(73) Assignee: Nokia Corporation (FI)

( * ) Notice: Subject to any disclaimer, the term of this patent is extended or adjusted under 35 U.S.C. 154(b) by 607 days.

(21) Appl. No.: 12/516,016

(22) PCT Filed: Nov. 23, 2006

(86) PCT No.: PCT/IB2006/003328
§ 371 (c)(1),
(2), (4) Date: Oct. 21, 2009

(87) PCT Pub. No.: WO2008/062250
PCT Pub. Date: May 29, 2008

(65) Prior Publication Data
US 2010/0062759 A1    Mar. 11, 2010

(51) Int. Cl.
*H04W 4/00*    (2009.01)
*G01R 31/08*   (2006.01)

(52) U.S. Cl.
USPC ........................................ 455/426.1; 370/229

(58) Field of Classification Search
USPC ............................ 455/426.1, 91; 370/229, 230
See application file for complete search history.

(56) References Cited

U.S. PATENT DOCUMENTS

| | | |
|---|---|---|
| 5,999,623 A | 12/1999 | Bowman et al. |
| 6,031,818 A | 2/2000 | Lo et al. |
| 6,212,175 B1 | 4/2001 | Harsch |
| 6,487,294 B1 | 11/2002 | Alexander |
| 6,678,740 B1 | 1/2004 | Rakib et al. |
| 6,789,196 B1 | 9/2004 | Miyano |
| 6,934,267 B1 * | 8/2005 | Mannerstråle ................ 370/311 |
| 6,937,570 B2 * | 8/2005 | Bhatt et al. ..................... 370/242 |
| 7,194,758 B1 | 3/2007 | Waki et al. |

(Continued)

FOREIGN PATENT DOCUMENTS

| | | |
|---|---|---|
| EP | 0912057 A2 | 4/1999 |
| EP | 1126707 A1 | 8/2001 |

(Continued)

OTHER PUBLICATIONS

Extended European Search Report and Search Opinion, receive in corresponding European Application No. 06809026.5, dated Oct. 7, 2011. 9 pages.

(Continued)

*Primary Examiner* — Kent Chang
*Assistant Examiner* — Scott Au
(74) *Attorney, Agent, or Firm* — Banner & Witcoff, Ltd.

(57) ABSTRACT

The present invention provides a method for maintaining continuity of radio transmissions, particularly unlicensed low-power FM transmissions, comprising transmitting frequency modulated media data via a radio transmission on a carrier frequency, interrupting the transmission of the media data while maintaining the transmission of the carrier frequency, transmitting a frequency modulated substitute signal during said interruption, and continuing the transmission of said frequency modulated media signal. The invention also provides an electronic device for radio transmission of media data with maintained link continuity, comprising a radio transmitter, a controller adapted for transmitting frequency modulated media data via a radio transmission on a carrier frequency, interrupting the transmission of said media data while maintaining the transmission of the carrier frequency, transmitting a frequency modulated substitute signal during said interruption, and continuing the transmission of said frequency modulated media signal.

29 Claims, 6 Drawing Sheets

(56) References Cited

U.S. PATENT DOCUMENTS

| | | | |
|---|---|---|---|
| 7,209,560 | B1 | 4/2007 | Fairman et al. |
| 2004/0078104 | A1* | 4/2004 | Nguyen et al. ............... 700/94 |
| 2004/0204158 | A1* | 10/2004 | Wang et al. ............. 455/569.1 |
| 2004/0204168 | A1* | 10/2004 | Laurila ................... 455/569.1 |
| 2005/0286508 | A1* | 12/2005 | Talguk ........................ 370/374 |
| 2006/0210037 | A1* | 9/2006 | Olafsson et al. ......... 379/93.34 |
| 2007/0072654 | A1* | 3/2007 | Cosgrove ................ 455/575.2 |
| 2009/0054020 | A1 | 2/2009 | Mason |
| 2010/0285732 | A1 | 11/2010 | Sinton et al. |

FOREIGN PATENT DOCUMENTS

| | | |
|---|---|---|
| GB | 2399719 A | 9/2004 |
| GB | 2406488 A | 3/2005 |
| WO | 2006/106379 | 10/2006 |
| WO | 2008/062249 | 5/2008 |

OTHER PUBLICATIONS

Electromagnetic compatibility and Radio Spectrum Matters (ERM); Cordless audio devices in the range 25MHz to 2000 MHz; Part 1: Technical characteristics and test methods, European Standard (Telecommunications series), Final draft ETSI EN 301 357-1 v1.3.1 (May 2006).

Chinese Patent Application No. 200680056457.8 Office Action dated Aug. 31, 2012.

RDS Forum, International Electrotechnical Commission, Specification of the Radio Data System (RDS) for VHF/FM Sound Broadcasting in the Frequency Range From 87,5 to 108,0 MHZ, 62106 © IEC:1999, 132 pages.

RDS the Radio Data System ISBN 0-89006-744-9—pp. 64 to 67 (2).

National Radio Systems Committee, National Association of Broadcasters, United States RBDS Standard, Specification of the radio broadcast data system (RBDS), Apr. 9, 1998, 204 pages.

\* cited by examiner

METHOD AND DEVICE FOR MAINTAINING CONTINUITY OF RADIO TRANSMISSIONS

RELATED APPLICATION

This application was originally filed as PCT Application No. PCT/IB2006/003328 filed Nov. 23, 2006.

The present invention is related to radio transmissions in mobile devices. It is particularly concerned with the handling of unlicensed low power radio transmissions of media content in situations where the provision of the media content is interrupted.

PRIOR ART

Low power FM (Frequency Modulation) transmitters for performing unlicensed broadcasts have become popular just recently. Such FM transmitters or FMTx devices can be used to transmit e.g. audio information to any conventional FM receiver. For example an mp3 enabled mobile phone equipped with an FMTx device can be used to transmit music wirelessly to an in-car FM stereo receiver.

In the described case the user might experience the situation where a call is incoming. Conventionally, the user is now required to mute the sound playback somehow. He/she could manually turn down the sound of the in-car audio system. However, this is uncomfortable. Also, as the FMTx will continue to transmit audio data via FM transmission there are some further drawbacks.

The FMTx enabled mobile phone now has to handle the routing of two separate data streams, the music audio stream output to the FMTx device as well as the voice audio stream of the phone call. This requires additional processing power that is restricted in mobile devices. It will also increase power consumption of the device at the same time. Also, due to the fact that music playback is not interrupted during the call, the user will have to manually rewind to the part where the music was interrupted. This is also inconvenient.

It would therefore seem reasonable to simply halt the audio playback within the phone itself, as events as incoming calls can easily be detected by the phone. However, this leads to another problem. Such halting would result in only the carrier frequency being transmitted, but without any modulated audio content. A receiver would stay tuned, but not play back any sound disturbing the user in his call.

However, some regulations (e.g. legislative or by an industry norm) require that the transmitter is turned off after a certain time period during which no audio data are actually sent. See e.g. the low power device (LPD) regulation of ETSI: ETSI EN 301 357-1 V1.3.1 (2006-07) ERM: Cordless audio devices in the range 25 MHz to 2000 MHz (section 8.1), which states that "Band II LPD shall cease to transmit within 1 minute of the removal of audio modulation". To comply with such regulations the transmitter has to be turned off in such situations. Turning off the transmitter in turn can cause the FM radio receiver in a car to act in an unpredictable manner. In the simplest case, the FM radio receiver may play back noise or any other background signal on the currently used frequency. This can be disturbing to the user making the phone call, and may consequently force him to turn off the radio receiver manually.

Another possibility is that the FM receiver tries to retune to another signal automatically. In case the receiver tunes to another presumably strong signal, perhaps a radio station, the user will again be disturbed in his ongoing phone call by an unwanted audio playback and be forced to turn the radio off manually. On the other hand, any retuning of the receiver by itself will also force the user to manually tune back the receiver after he/she has finished the call, in order to be able to continue the audio playback.

Therefore, there is a need for a method and a device for ensuring transmission continuity even in situations wherein the media playback is (to be) interrupted, without producing disturbance to the user, and without requiring any manual interaction of the user, while also complying to legal restrictions related to low power transmitters.

SUMMARY OF THE INVENTION

According to a first aspect of the present invention a method for maintaining continuity of radio transmissions is provided, the method comprising:

transmitting frequency modulated media data via a radio transmission on a carrier frequency;

interrupting the transmission of the media data while maintaining the transmission of the carrier frequency;

transmitting a frequency modulated substitute signal during said interruption; and continuing the transmission of said frequency modulated media signal.

The inventive method enables to handle interruptions in the media stream in an improved manner in mobile electronic devices having an FM transmission capability. Such interruptions can occur due to external events like an incoming phone call, or due to a user-operated interruption. During the interruption a substitute signal is sent. After the interruption has ended, e.g. due to the user having finished the phone call, the transmission of the media signal is continued.

The inventive method enables to keep any FM receiver tuned to the currently used frequency, while the user is not disturbed with any unwanted audio playback. As an additional advantage, the user can be enabled to continue listening to the media content starting from where the interruption occurred. Special legislations related to low power radio transmitter devices can be complied with by using the inventive method.

According to an exemplary embodiment said substitute signal is repeatedly transmitted with a pre-determined duration and a pre-determined repetition rate, i.e. may be regarded as a kind of "burst" signal. That is, only a short or "burst" signal is transmitted during the interruption, in a repeated manner. This enables inter alia to generate the substitute signal from a very small data content, which can be advantageous, in particular for implementations wherein the radio transmitter device is embodied as an accessory device having only limited storage and processing capabilities. It also enables to keep any disturbance caused by the substitute signal at a low level, as the repetition rate can be adjusted to have only few signaling events per time unit. The repetition rate has to be adjusted such that the FM receiver will not attempt to tune to another frequency between the "bursts".

According to an exemplary embodiment said media data are audio data, and wherein transmitting said substitute signal comprises continuing transmitting said media data with a reduced volume. This is a very simple yet effective implementation. It can be combined with a "restart" or "rewind" function in order to restart playback of the music from the time when the interruption occurred. Alternatively, the user continues to use the FMTx feature to continue listening to music after the interruption.

According to an exemplary embodiment, the transmission of said substitute signal is performed after expiration of a pre-determined initial time offset starting at the beginning of said interruption. This embodiment is particularly useful in cases when the interruption only has a short duration. If the interruption is short, e.g. due to the user initiating a jump to another music track which may cause a short pause, it is not necessary to start with the transmission of the substitute signal before expiration of the initial time offset.

According to an exemplary embodiment the method further comprises:

monitoring a pre-determined condition;

wherein said interruption is performed upon occurrence of said condition and said continuation is performed upon termination of said condition.

The automatic detection of the occurrence of conditions requiring an interruption in the media signal improves the comfort for the user, as the handling of the interruption is performed without requiring any manual user interaction. The condition can be an ongoing phone call, a user-operated interruption or any other condition requiring a temporary interruption.

According to an exemplary embodiment the substitute data is one of:

a pre-defined melody;
a pre-defined sound;
a synthesized sound;
a random sound.

The substitute data will usually represent a short audio piece or like. This audio piece, e.g. an audio tone, will also be of an adjustable, preferably low volume and can further be adjusted to have a frequency that is not disturbing to a user. The melody or sound piece can be customized, that is, the invention enables to manipulate it according to the user's desires or other conditions. The substitute data can both be retrieved from a storage, or be generated "on-the-fly" from source data.

The substitute data can also be selected in such a way that it is easily concealed by the surrounding sound, e.g. of a car environment. This may be achieved by sound samples that contain predominantly frequencies that are also part of the audio spectrum of the car noise. In one embodiment, the substitute data contains samples of environmental sound that are captured using a microphone.

A random sound may comprise random sound elements, or it may comprise pre-defined or pre-recorded sound elements that are played in a random fashion, thereby varying pitch, beat, harmony, time, loudness and/or further sound-related aspects.

According to an exemplary embodiment, information according to the Radio Data System is also transmitted on said carrier frequency, and at least part of said information is transmitted also during said interruption. This enables to provide the FM receiver with updated RDS related data, e.g. an updated list of Alternate Frequencies, during the interruption. After the interruption has ended, the FM receiver is thus still in optimal condition for proceeding with the audio playback.

According to another aspect a computer program product is provided, comprising instructions stored on computer-readable medium, for instructing a computer to perform the steps of the method described above when run on the computer.

According to another aspect of the present invention an electronic device for radio transmission of media data is provided, the device comprising:

a radio transmitter;
a memory for storing substitute data;
a controller adapted for transmitting frequency modulated media data via a radio transmission on a carrier frequency, interrupting the transmission of said media data while maintaining the transmission of the carrier frequency, transmitting a frequency modulated substitute signal during said interruption, and continuing the transmission of said frequency modulated media signal.

According to an exemplary embodiment said controller is adapted for repeatedly transmitting said substitute signal with a pre-determined duration and a pre-determined repetition rate.

According to an exemplary embodiment said media data are audio data, and said controller is adapted for reducing the volume of said audio data and transmitting said audio data with reduced volume as said substitute signal.)

According to an exemplary embodiment the controller is adapted for performing said transmission of said substitute signal after expiration of a pre-determined time offset starting at the begin of said interruption.

According to an exemplary embodiment the controller is adapted for monitoring a pre-determined condition, and for performing said interruption upon occurrence of said condition and said continuation upon termination of said condition. The condition can be an ongoing phone call, a user-operated interruption or other conditions requiring an interruption in the media transmission.

According to an exemplary embodiment the device further comprises:

a memory for storing substitute data.

This enables to pre-store data for generating a substitute signal. As the data can so be stored in the FMTx device being implemented as an accessory device, there is no need for data communication with a connected electronic device providing the media data, in order to generate the substitute signal. This enables inter alia lower power consumption and less usage of data bandwidth. Also this embodiment allows an easy replacement of the substitute sound.

According to an exemplary embodiment the substitute data is one of:

a pre-defined melody;
a pre-defined sound;
a synthesized sound;
a random sound.

According to an exemplary embodiment the controller is adapted for transmitting information according to the Radio Data System along with said media data, and transmitting at least part of said RDS information along with said substitute signal.

According to an exemplary embodiment the device is a mobile electronic device. In alternative embodiments the device is a mobile phone.

According to an exemplary embodiment the device further comprises:

a user interface;

wherein said controller is adapted for performing said interrupting, said transmitting of said substitute signal, and said continuing of the transmission responsive to respective user commands received via said user interface.

According to an exemplary embodiment the device is an accessory device for a mobile electronic device, and further comprises:

a media data interface for receiving said media data to be transmitted;

wherein said controller is adapted for detecting an interruption in the reception of media data, and for performing said interrupting of the transmission of said media data during a detected interruption.

This enables an accessory device which takes care of the FM transmission on its own to recognize when there are no audio data coming in from the mobile device. In order to maintain the link continuity the accessory device can automatically handle the interruption.

According to an exemplary embodiment the media data interface is an analogue interface, and an interruption is detected when the received signal level on said media data interface is below a pre-determined threshold.

This embodiment applies to an accessory device having an analogue audio connection to the mobile device. As there will always be some audio level even when there is no actual audio playback this embodiment enables to suitably handle interrupt conditions for this analogue case.

According to an exemplary embodiment the device is an accessory device for a mobile electronic device, and further comprises:

a control interface for receiving control commands from said mobile electronic device;
wherein said controller is adapted for performing said interrupting, said transmitting of said substitute signal, and said continuing of the transmission responsive to respective control commands received via said control interface.

The control interface can e.g. be implemented as a mini-USB connection. Control interface and media data interface can be implemented separately or over a commonly used link, like USB or other wired or wireless links.

BRIEF DESCRIPTION OF THE DRAWINGS

The invention can be more fully understood by the following detailed description of exemplary embodiments, when also referring to the drawings, which are provided in an exemplary manner only and are not intended to limit the invention to any particular embodiment illustrated therein. In the drawings

DETAILED DESCRIPTION OF THE INVENTION

Figure 1:
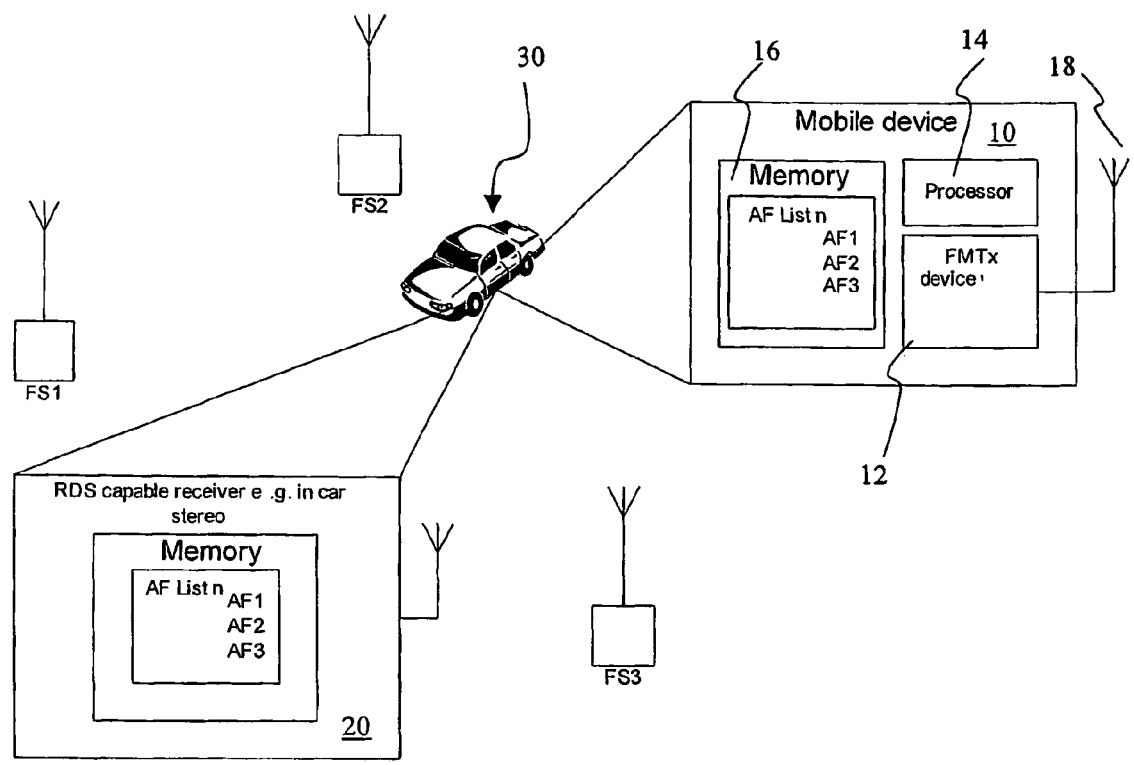
FIG. 1 presents a system block diagram showing a prior art implementation.

The invention is related e.g. to a scenario of a mobile phone that also contains an audio player (e.g. an MP3-player). An FM transmitter can be connected to the phone in order to listen to the music from the FM stereo of a car, or such a transmitter may be integrated into the phone. When there is an incoming (or outgoing) phone call, the sound transmission has to be turned down or muted, respectively. However, there is a problem with muting the audio completely.

According to some local legislation, e.g. in the European Union, it is not allowed to transmit an unmodulated carrier in the FM radio system for more than a certain time (e.g. 1 minute). Switching off the carrier may as well yield unpredictable results in the FM radio receiver. Some receivers may behave as required, i.e. simply mute the received channel until transmission starts again. However, other receivers might start scanning for other radio channels, first with the same station ID, and then maybe for further channels. Finally, some receivers might not mute the station but simply play noise or whatever they receive on the (now temporarily unoccupied) frequency. Therefore this scheme is not desirable or even forbidden by local legislation or other kind of regulation.

Mobile devices utilizing FMTx features will need to comply with these regulations in order to be legally sold around the world. This causes problems with FMTx capable devices (especially mobile phones) that wish to maintain an Alternate Frequency, AF list with the FM receiver (e.g. an in-car stereo) or generally maintain a link to the FM receiver, and have to mute the FMTx audio due to situations such as taking a cellular call or perhaps pausing the audio playback by user input. The problem arises when the call or pause duration exceeds the legal limit of e.g. one minute at which point the FMTx carrier must be removed since the device is not allowed to transmit silence for more than a minute.

This means that the FM transmitter will be unable to send any audio and/or RDS data along with the audio and hence the FM receiver may lose the contact. Depending on the implementation of RDS within the FM receiver being used, under these circumstances, the FM receiver may behave in an unspecified manner.

An FM receiver may begin to scan automatically for another strong signal and hence choose to lock on to a different radio station, perhaps with a different Program Identification, PI code (or maybe with the same PI code) and hence a different AF list. If this occurs then the FMTx device has effectively lost synchronization with the FM receiver and the user will be forced to set up the system again. This will not only prove annoying to the user but may also be distracting if the user is the driver of a vehicle where the FMTx device is being used. Another possible side effect is that the FM receiver being used may emanate noise from the) speakers due to the fact that the carrier has been removed. This again is obviously dependant on the FM receiver being used.

Alternatively, playback might also be continued at a very low volume, for example in case of a phone call. It can apparently not be applied when the interruption occurs due to the user controlling the device to pause the audio. Low-volume playback avoids the problem of transmitting an unmodulated carrier and is thus in conformance with the mentioned legal regulations.

In an embodiment the mobile device thus continues routing the audio data from e.g. the MP3-player application to the FMTx device (at a reduced volume level) while at the same time it routes the audio from the voice call to the loudspeaker or headset interface. In this case, the playback of the music can be continued at a reduced audio level.

After finishing the call, the user may rewind manually the music to the point in time when the phone call came in. Alternatively, the user may be asked by a user query to continue listening or restart listening from the point in time when the phone call came in. Such a query could just persist for maybe 20 seconds (while the music is played on), and if not answered, the query simply disappears, while the music continues playing. If the query is answered positively, then the music is repeated from the time that the phone call came in.

Alternatively, in accordance with an embodiment of the invention the player is paused and the FM transmitter is instructed to transmit some stored music, sound or other "dummy" media content at a very low volume. This requires that the FM transmitter has some storage for a simple sound or melody (that is continuously repeated during the phone call), a controller to control this, and a control interface.

As a controller may be needed for Radio Data System tasks as well, this does not incur much additional hardware overhead in devices already using RDS features like AF (Alternate Frequency), PI code (program identification), PS (program service) name, etc. The control interface may also be used to communicate RDS information containing the song title and/or author of the current audio transmission. Additional commands need to be defined on the control interface for starting and stopping playing the "replacement sound", adjusting the volume level of the replacement sound and maybe downloading a new replacement sound (if such a feature is supported). This implementation fulfils the regulative requirement and has the additional benefit that it can also be implemented with a simple audio routing. It also enables the user to continue playback where it has been stopped, without having to rewind manually.

In addition, the invention suggests that the carrier signal being transmitted from the FMTx device remains on but low volume and/or occasional audio data are transmitted. The period of transmission may be only e.g. a second in length and the repetition rate may be every 5 seconds. The volume and tone frequency can be adjusted to the actual needs.

To meet the legal restrictions described above, the repetition rate of this short audio signal must be less than one minute, or in other words the transmission of silence between audio "bursts" must not reach one minute. Depending on the implementation and the use case, the timings can be adjusted as appropriate. The reason for doing this is to minimize distraction to the user and hence limit audio interruptions during the call.

This approach of the invention provides the following benefits:

1) The user is reminded that an FMTx session is in progress.)
2) The FM receiver is kept in sync (in tune) with the FMTx device.
3) The legislation is being met.
4) Potential noise emanating from the FM receiver is effectively avoided.

It is also possible that different tone frequencies and/or different repetition rates are used to indicate different states of the FMTx system. An example of this could be when an alarm condition occurs. A low battery could be indicated similarly.

There are at least two exemplary embodiments for implementing the invention in a mobile device connected to/comprising an FMTx device:

In a first exemplary embodiment all of the logic can be placed within the FMTx device and an Application Interface, API is provided to control the feature. A possible corresponding embodiment of this implementation will be explained in more detail in FIG. 5.

This first possibility simplifies the system software and possible audio routing implications. Having the FMTx device periodically send short audio bursts with the burst tone being generated from within the FMTx device means that a tone does not have to be generated and routed to the FMTx device by the mobile device's control software when the mobile device is in call.

Existing RDS data that was last received from the mobile phone engine could also be transmitted during the burst transmission. Updated AF list information could thus still be passed to the FMTx device when in this mode of operation to ensure that even during a call the FM receiver always has the most up to date AF list information. This is particularly important when the mobile device is located in a moving vehicle. Moving the logic and control to the FMTx device also has the potential to reduce the overall power consumed by the mobile device due to reduced processor loading.

In a second exemplary embodiment use of existing FMTx device API capabilities can be made and the logic and control can be placed in the mobile device's software. A possible embodiment of this implementation will be explained in detail in FIG. 4.

Using this second exemplary implementation means that the mobile device's software controls every aspect of performing the invention, in the sense that the burst tone is generated by the mobile device's controller and the mobile device comprises timers set up in order to determine when the burst is supposed to be performed and for how long.

The following advantages can be achieved using the present invention. There is no need to update the existing RDS specification and hence no modifications or updates to FM receivers are required. The invention can help to prevent that the FM receiver is beginning an auto scan and hence might lose synchronization with the FMTx device. Comfort for the user is improved, by providing a seamless FMTx implementation that can be interrupted and resumed at will or by external events like incoming phone calls. The implementation can either be made in the mobile device's software or in an embedded manner in the FMTx device. Any unwanted noise emanating from the FM receiver's speakers can be avoided. The user is provided with a reminder/confidence tone indicating that the FMTx session is in a paused/suspended state, but still in progress.

FIG. 1 shows the current art situation. FS1, 2 & 3 are legal radio stations that may be broadcasting various radio programs. The mobile device 10 and the RDS capable FM receiver 20 are in this case traveling inside a car 30. The mobile device 10 comprises an FM transmitter or FMTx device 12, a processor 14 and a memory 16.

The user will set up the FMTx system such that he is able to listen to his music collection (or other audio data) via the vehicle's FM radio. As the vehicle moves, signals from the various surrounding radio stations/transmitters will vary in their signal strength. The mobile device's FMTx implementation or an additional FM receiver (not shown) inside the mobile device (10) is able to listen to the FM radio band and detect the quiet frequencies/channels within that area at that time (Received Signal Strength Indicator, RSSI). Information for building an Alternate Frequency list can thus be obtained. This AF list information is then broadcast to the in-car FM receiver 20 and this information is used to maintain a continuous link between the FMTx device and the FM in-car stereo receiver 20 such that the user has little or no interruption in his FMTx listening experience.

Figure 2:
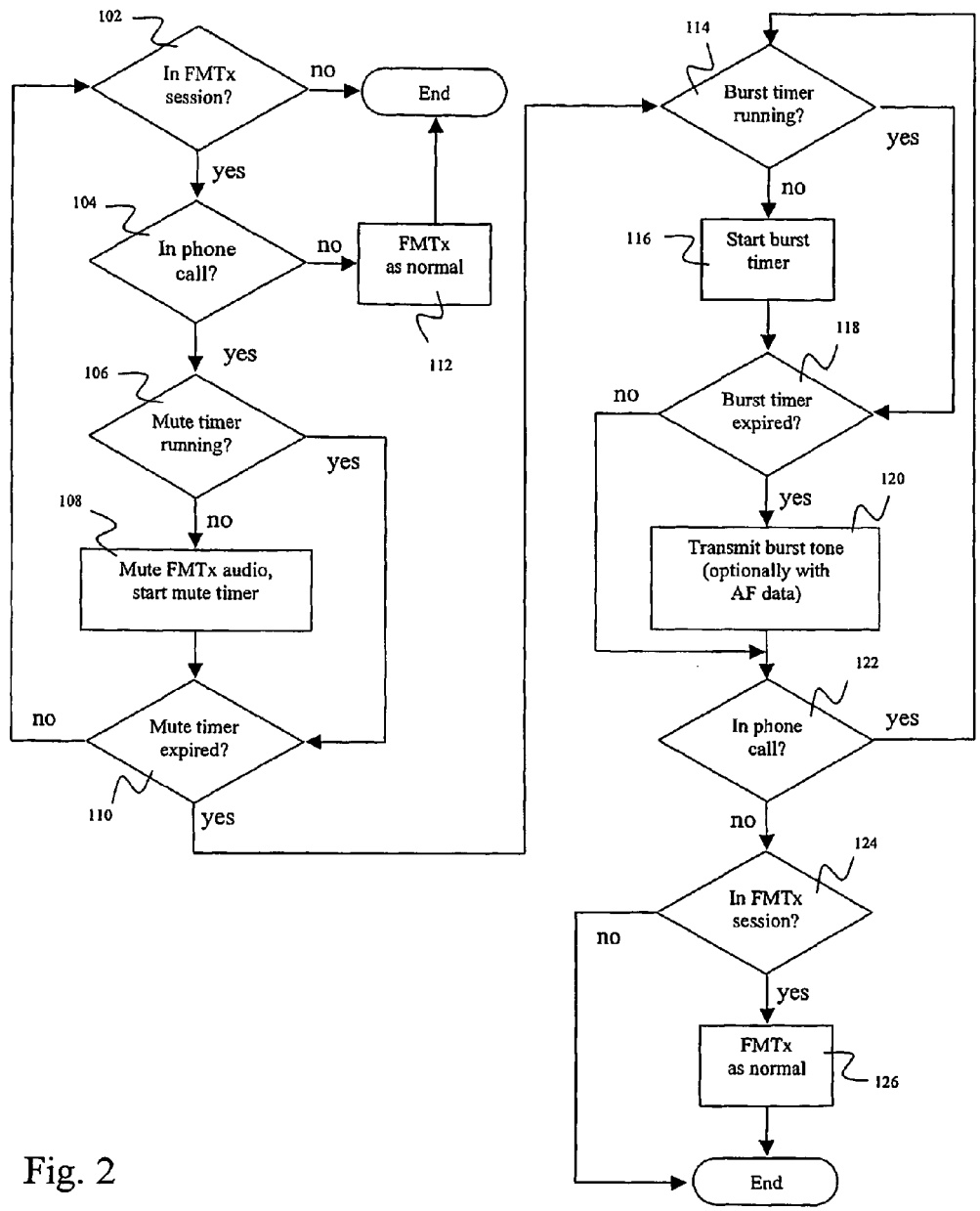
FIG. 2 presents a flow diagram of an exemplary embodiment of the method according to the invention.

FIG. 2 presents a flow diagram of an exemplary embodiment of the method according to the invention. This flow diagram illustrates how the burst tone feature may be implemented and concentrates on the period when a call is handled by a mobile device (such as a mobile phone). This may take into account a period of up to one minute of transmitting silence and only then beginning transmission of substitute data.

In step 102, it is checked if an FMTx session is in progress. If the answer is yes, in step 104, it is further checked if a phone call is in progress. In case of "no" the FMTx session is performed as normal in step 112, until it is ended. Otherwise, if the answer in step 104 is yes, it is checked in step 106 if the mute timer is already running. If not, the FMTx audio transmission is muted and the mute timer is started in step 108. Either way the process continues in step 110. Here it is checked if the mute timer has expired. In case of "no" the process beings again in step 102. Otherwise the process continues with step 114.

It is to be noted that steps 106 to 110 are optional in embodiments of the invention. In case step 106 is not present, the sub-step of starting the mute timer in step 108 is omitted. Furthermore in this case step 104 directly proceeds to step 114.

In step 114 it is checked if the burst timer is already running. If "no" it is started in step 116, otherwise the process continues in step 118. Here it is checked if the burst timer has expired. If the answer is "yes", the burst tone is transmitted in step 120. This can optionally be combined with the transmission of Alternate Frequency data of the Radio Data System. If the answer in step 118 is "no", or the burst tone has been transmitted in step 120, the process continues in step 122.

Here it is checked if the phone call is still ongoing. In case of "yes" the process returns to step 114. Otherwise another check is made in step 124 if an FMTx session is still in progress. While in case of "no" the process is terminated, "yes" leads to step 126, where the FMTx session is performed normally until it is ended.

Figure 3:
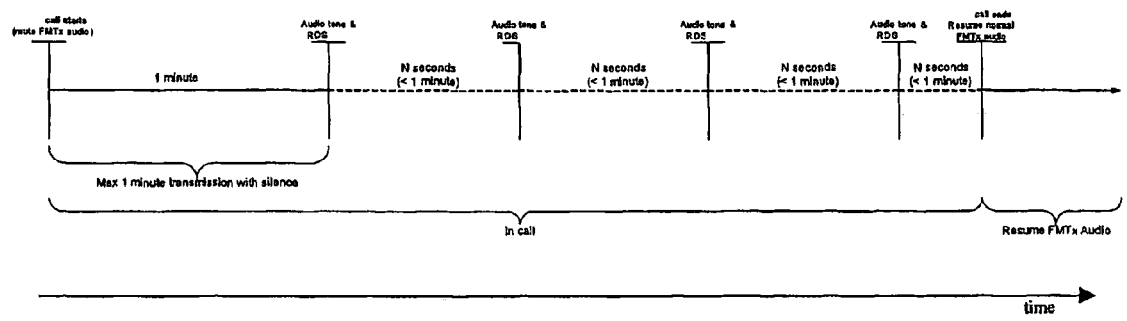
FIG. 3 presents a timing diagram illustration of an exemplary embodiment of using a burst tone according to the present invention.

FIG. 3 presents a timing diagram illustration of an exemplary embodiment of using a burst tone according to the present invention. The implementation is depicted here in a way that embodies some timing information. This is a typical use case where the burst functionality would be deemed necessary in a mobile device in order to overcome the low power device (LPD) regulation as detailed above.

On the x-axis the time is represented. On the left of the figure it is assumed that a call has started. This results in the FMTx audio being muted. Muting means that the carrier of the FM transmission is still transmitted, but the modulation of the carrier with an audio signal is stopped. After one minute of silence a burst of audio, optionally together with RDS data, is transmitted. This is in conformance with the LPD regulation which has been described earlier, but the procedure may be adjusted to similar regulations, if necessary. The audio (and RDS) burst is repeated every N seconds, wherein N<60 (i.e. less than one minute). This process is repeated until the call ends towards the right of the figure.

It is to be noted that the depicted initial period of one minute is only exemplary. It may both be adjusted to the specific needs and/or legal regulations as well as totally omitted. That is, the burst transmission may already start at the beginning of the interruption. The same holds true for the repetition rate, which can be different than <60 seconds. In further embodiments it can even be "infinity", that is, the "burst" transmission can also be implemented as a continuous transmission having no repetition rate at all.

In an alternative embodiment, the RDS data may be transmitted continuously as required by the RDS specification.

Figure 4:
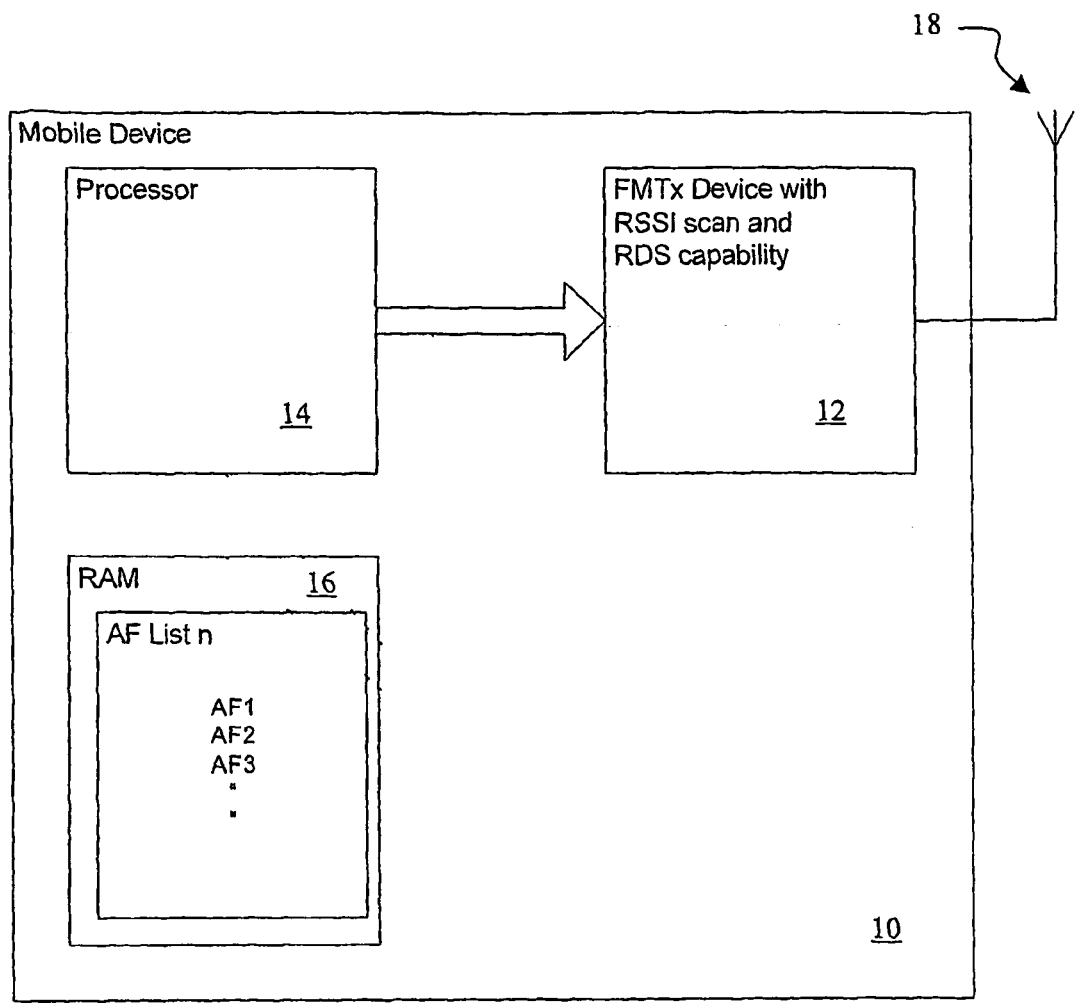
FIG. 4 presents a block diagram of an exemplary embodiment of the invention.

FIG. 4 shows an exemplary embodiment of a mobile device 10 according to the invention in form of a system block diagram where the burst feature is implemented in the mobile device's system software such that it will make use of the existing FMTx 12 device's communication interface already available. The burst control for the FMTx device 12 is driven by a processor 14 of the mobile device, and using an existing communication interface of the FMTx device 12 (indicated by the arrow). The mobile device 10 further comprises a RAM memory 16, e.g. for holding AF data. It can also be used to store substitute data like the burst tone, or control data for enabling to generate the burst tone. The burst control may be integrated into the system controller or processor 14 of the mobile device. In all embodiments depicted in FIG. 5-7 an antenna 18 represents the actual FM transmitter block.

Figure 5:
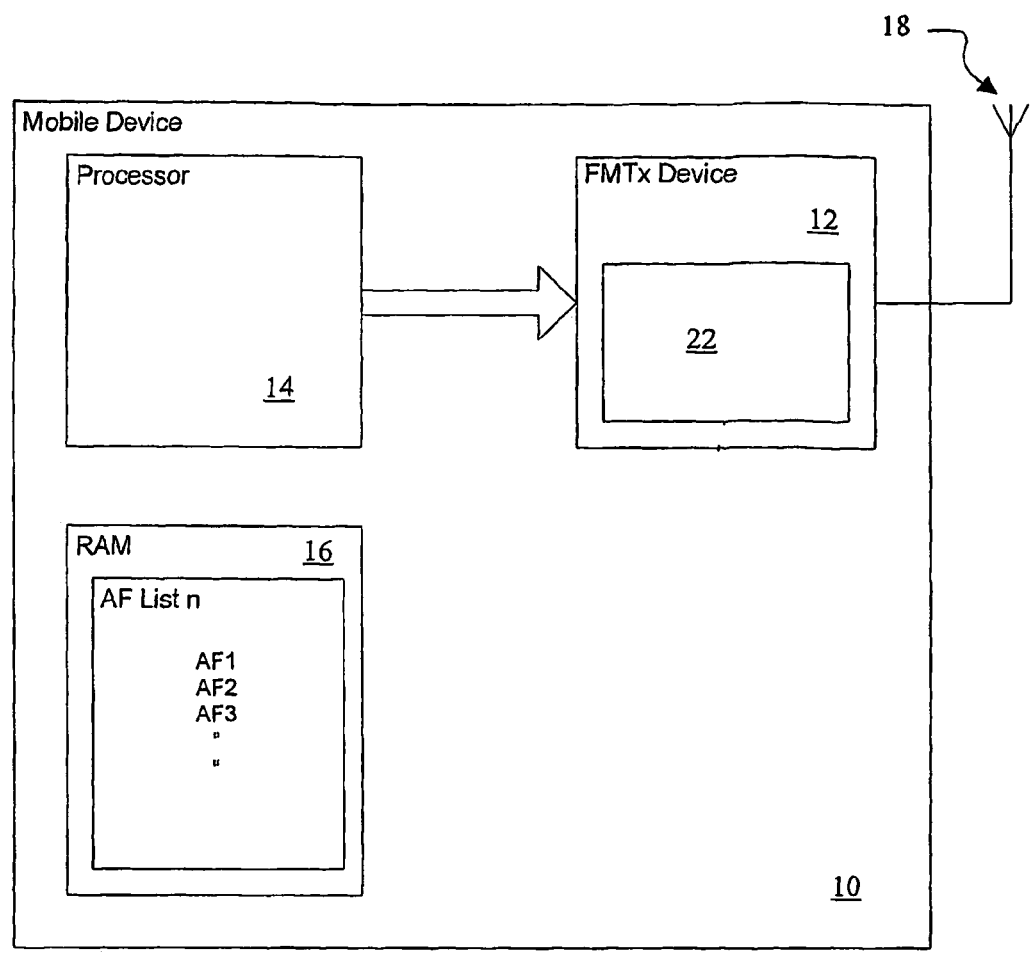
FIG. 5 presents a block diagram of another exemplary embodiment of the invention.

FIG. 5 shows another exemplary embodiment of a mobile device 10 according to the invention in form of a system block diagram where the burst feature is implemented embedded within the FMTx device 12. The mobile device 10 will therefore only need to utilize the API required for controlling the burst feature embedded in the FMTx device 12. The FMTx device 12 in turn comprises a burst control block 22, which is further detailed in FIG. 6. This implementation alleviates the mobile device 10 from having to control the burst feature while the mobile device 10 is e.g. within call. This can help to simplify the mobile device system and reduce the processor loading and hence also potentially help reduce power consumed by the mobile device.

In case the FM transmitter is an accessory to a mobile phone, it can be implemented comprising its own processor and memory (RAM). It communicates with the mobile device through an accessory or control interface. The mobile device may activate or deactivate substitute signal transmission by appropriate commands on the control interface. Substitute data is stored in the memory of the FM transmitter. However, new or alternative data can be sent from the mobile device to the FM transmitter on the control interface for being transmitted as a substitute signal instead of the stored substitute data. The processor of the FM transmitter device may control the transmission of substitute signals when corresponding commands are received on the control interface. The accessory interface may be a standardized bus, like USB or a serial port (UART), or it may comprise a proprietary interface, both wire-based and wireless.

Figure 6:
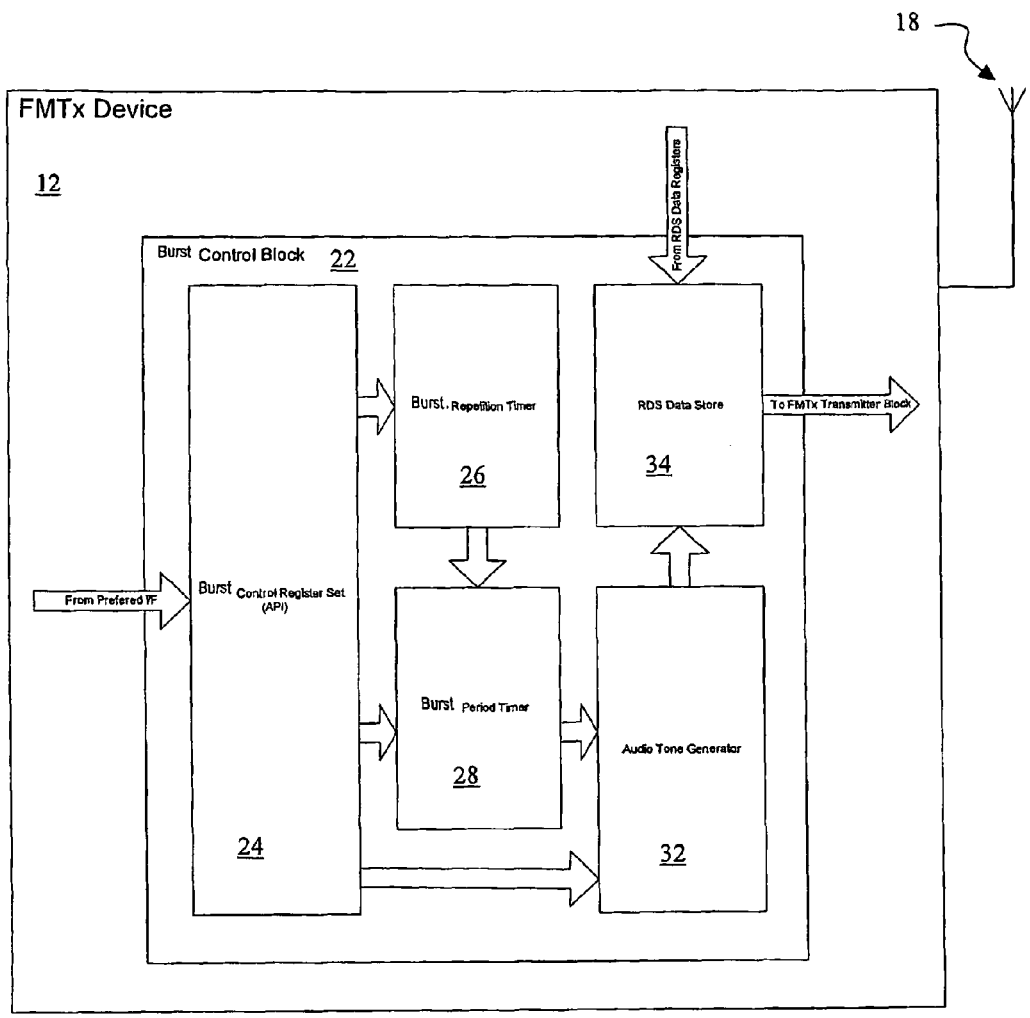
FIG. 6 presents a block diagram showing elements of a control arrangement to be used in an embodiment of the present invention.

FIG. 6 shows how the embedded burst control block 22 can be implemented in an FMTx device 12. The control block 22 comprises a bank of control registers 24 for the burst control block API (application programming interface), a burst repetition timer block 26, a burst period timer block 28, an audio tone generator block 32 and an optional temporary RDS data storage block 34. The API registers allow controlling the 'pulse period' timing of the burst via an interface I/F from a mobile device, i.e. how long the actual burst is and what the repetition rate of that burst will be. The repetition timer 26 is used to repeat the burst periodically for example when the mobile device is in call. The burst period timer block 28 is used to control how long the transmitted tone is. The tone is generated by the audio tone generator 32.

Tone generation includes retrieving a stored "dummy" tone or other audio or melody piece as well as generating the burst tone or melody. The volume and the frequency of the tone can be controlled via the burst API. This tone is then sent, optionally along with the current RDS data that is obtained from the RDS data registers and stored in the RDS data storage 34, to the FM transmitter block 18 where the tone (and optionally RDS data) is transmitted. The burst intervals must not exceed the time specified by a valid legal restriction (e.g. one minute) and can be adjusted accordingly. Of course this time may be amended in future updates to the recommended regulation in case the latter changes. Alternatively, the tone generation works continuously without intervals. In all cases, the volume of the generated tone may be set to a low level in order not to disturb an ongoing phone conversation.

To summarize, the invention utilizes periodic short bursts of an audio tone which may include RDS data in order to maintain the FM link between the FMTx device and the FM receiver while the FMTx main audio is in a paused or suspended state thus also complying with legislation as detailed above.

The invention claimed is:
1. A method comprising:
    transmitting, by a mobile electronic device, a carrier frequency for a radio transmission;
    while maintaining transmission of the carrier frequency, frequency modulating media data onto the carrier frequency;

while maintaining transmission of the carrier frequency, determining to interrupt the frequency modulation of the media data onto the carrier frequency;

during the interrupt and while maintaining transmission of the carrier frequency, frequency modulating substitute data onto the carrier frequency; and resuming frequency modulation of the media data onto the carrier frequency.

2. The method according to claim 1, further comprising: repeatedly frequency modulating the substitute data onto the carrier frequency during the interrupt.

3. The method according to claim 1, wherein said media data comprises data representing audio, and wherein frequency modulating the substitute data onto the carrier frequency produces a modulated signal with the data representing audio at a reduced volume.

4. The method according to claim 1, wherein frequency modulating the substitute data onto the carrier frequency is performed after expiration of a time offset starting upon beginning the interrupt.

5. The method according to claim 1, further comprising: monitoring for a condition;
wherein determining to interrupt the frequency modulation of the media data is conditioned upon occurrence of the condition and wherein resuming the frequency modulation of the media data onto the carrier frequency is performed upon termination of the condition.

6. The method according to claim 5, wherein the condition is one of:
a phone call or a user-operated interruption.

7. The method according to claim 1, wherein the substitute data is one of:
a pre-defined melody, a pre-defined sound, a synthesized sound, or a random sound.

8. The method according to claim 1, further comprising: transmitting Radio Data System (RDS) information for the radio transmission prior to the interrupt and again during the interrupt.

9. The method according to claim 1, wherein the radio transmission is an unlicensed low power frequency modulation (FM) transmission from the mobile electronic device.

10. The method according to claim 1, wherein determining to interrupt the frequency modulation of the media data onto the carrier frequency is conditioned upon an incoming or outgoing telephone call at the mobile electronic device, and the substitute data is different from audio of the incoming or outgoing telephone call.

11. A non-transitory computer-readable medium storing computer program code that, when executed, causes an apparatus at least to:
transmit a carrier frequency for a radio transmission;
while maintaining transmission of the carrier frequency, frequency modulate media data onto the carrier frequency;
while maintaining transmission of the carrier frequency, determine to interrupt the frequency modulation of the media data onto the carrier frequency;
during the interrupt and while maintaining transmission of the carrier frequency, frequency modulate substitute data onto the carrier frequency; and
resume frequency modulation of the media data onto the carrier frequency.

12. The non-transitory computer-readable medium according to claim 11, wherein the apparatus is a mobile electronic device and wherein the radio transmission is an unlicensed low power frequency modulation (FM) transmission from the mobile electronic device.

13. The non-transitory computer-readable medium according to claim 11, wherein the apparatus is a mobile electronic device and wherein determining to interrupt the frequency modulation of the media data onto the carrier frequency is conditioned upon an incoming or outgoing telephone call at the mobile electronic device, and the substitute data is different from audio of the incoming or outgoing telephone call.

14. An apparatus comprising:
a processor; and memory storing instructions configured to, with the processor, cause the apparatus to at least:
transmit a carrier frequency for a radio transmission,
while maintaining transmission of the carrier frequency, frequency modulate media data onto the carrier frequency,
while maintaining transmission of the carrier frequency, determine to interrupt the frequency modulation of the media data,
during the interrupt and while maintaining transmission of the carrier frequency, frequency modulating substitute data onto the carrier frequency, and
resume frequency modulation of the media data onto the carrier frequency.

15. The apparatus according to claim 14, wherein the memory further stores instructions configured to, with the processor, cause the apparatus to:
repeatedly frequency modulate the substitute data onto the carrier frequency during the interrupt.

16. The apparatus according to claim 14, wherein said media data comprises data representing audio, and wherein frequency modulating the substitute data onto the carrier frequency produces a modulated signal with the data representing audio at a reduced volume.

17. The apparatus according to claim 14, wherein frequency modulating the substitute data onto the carrier frequency is performed after expiration of a time offset starting upon beginning the interrupt.

18. The apparatus according to claim 14, wherein the memory further stores instructions configured to, with the processor, cause the apparatus to:
monitor for a condition, and
wherein determining to interrupt the frequency modulation of the media data is conditioned upon occurrence of the condition and wherein resuming the frequency modulation of the media data onto the carrier frequency is performed upon termination of the condition.

19. The apparatus according to claim 18, wherein the condition is one of:
a phone call or a user-operated interruption.

20. The apparatus according to claim 14, further comprising
a storage medium storing the substitute data.

21. The apparatus according to claim 20, wherein the substitute data is one of:
a pre-defined melody, a pre-defined sound, a synthesized sound, or a random sound.

22. The apparatus according to claim 14, wherein the memory further stores instructions configured to, with the processor, cause the apparatus to:
transmit Radio Data System (RDS) information for the radio transmission prior to the interrupt and again during the interrupt.

23. The apparatus according to claim 14, wherein the apparatus is a frequency modulation transmitter (FMTx) enabled mobile electronic device and the radio transmission is intended for an FM receiver.

24. The apparatus according to claim 23, further comprising:
a user interface;
wherein determining to interrupt, frequency modulating the substitute data, and resuming frequency modulation of the media data are each responsive to one or more respective user commands received via the user interface.

25. The apparatus according to claim 14, wherein the apparatus is configured to be an accessory device for a mobile electronic device, and wherein the apparatus further comprises:
a media data interface for receiving a media stream providing the media data to be transmitted;
wherein determining to interrupt is conditioned upon detecting an interruption in reception of the media stream at the apparatus, and wherein frequency modulating the substitute data onto the carrier frequency is performed during the detected interruption in the reception of the media stream.

26. The apparatus according to claim 25, wherein the media data interface is an analogue interface, and wherein detecting the interruption in the reception of the media stream includes detecting when a signal level at the media data interface is below a pre-determined threshold.

27. The apparatus according to claim 14, wherein the apparatus is an accessory device for a mobile electronic device, and wherein the apparatus further comprises:
a control interface for receiving control commands from said mobile electronic device;
wherein determining to interrupt, frequency modulating the substitute data, and resuming frequency modulation of the media data are each responsive to one or more respective control commands received via said control interface.

28. The apparatus according to claim 14, wherein the apparatus is a mobile electronic device and wherein the radio transmission is an unlicensed low power frequency modulation (FM) transmission from the mobile electronic device.

29. The apparatus according to claim 14, wherein determining to interrupt the frequency modulation of the media data onto the carrier frequency is conditioned upon an incoming or outgoing telephone call at the apparatus, and the substitute data is different from audio of the incoming or outgoing telephone call.

* * * * *

UNITED STATES PATENT AND TRADEMARK OFFICE
CERTIFICATE OF CORRECTION

PATENT NO.       : 8,655,351 B2
APPLICATION NO.  : 12/516016
DATED            : February 18, 2014
INVENTOR(S)      : Sinton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Twenty-ninth Day of September, 2015

Michelle K. Lee
*Director of the United States Patent and Trademark Office*